United States Patent [19]

Ridout

[11] Patent Number: 4,998,785
[45] Date of Patent: Mar. 12, 1991

[54] DECORATIVE SURFACE AND A METHOD OF PRODUCING IT

[76] Inventor: Graham T. Ridout, Lane End, Monkshanger, Farnham, Surrey, United Kingdom

[21] Appl. No.: 70,026

[22] Filed: Jul. 6, 1987

[30] Foreign Application Priority Data

Jul. 4, 1986 [GB] United Kingdom ............... 8616381

[51] Int. Cl.[5] .......................... G02B 5/32; G03H 1/02
[52] U.S. Cl. ....................................... 350/3.7; 350/3.6
[58] Field of Search ................. 350/3.6, 320, 3.81, 350/162.18, 167, 3.77, 3.67, 3.7, 124

[56] References Cited

U.S. PATENT DOCUMENTS 3,619,021 11/1971 Biedermann et al. ............... 350/3.7
4,094,575 6/1978 Kellie ............................. 350/162.18

FOREIGN PATENT DOCUMENTS 1218813 1/1971 United Kingdom .
1280996 7/1972 United Kingdom .
1399288 7/1975 United Kingdom .
1410056 10/1975 United Kingdom .

Primary Examiner—Bruce Y. Arnold
Assistant Examiner—James Phan
Attorney, Agent, or Firm—Harvey Kaye; Jerry Cohen

[57] ABSTRACT

A material has a reflective surface which bears a light diffracting pattern in the form of a series of well-defined grooves and ridges, wherein the transverse cross-section of the surface has a non-cyclical sequence of peaks and troughs. The pattern is produced by a method involving the interference of a first reference beam of coherent light with a second beam of coherent light, the second beam consisting of a bundle of divergent beams all of which illuminate the same area as the first beam. Apparatus for this method has a special lens system for producing the second beam.

6 Claims, 3 Drawing Sheets

DECORATIVE SURFACE AND A METHOD OF PRODUCING IT

This invention relates to a decorative surface and a method of producing it.

Reflective sheet materials carrying a decorative pattern which refracts light so as to produce an image having areas of differing colours are well known. The surface itself is not coloured, but each area is embossed with a pattern which diffracts light so as to give a bright colour to each area. A method of producing such a pattern using masks for each area is described in Patent Application No. WO 82/01595.

A holographic technique to produce the pattern within an area is described, which involves the interference of a coherent light source with a spatially incoherent light source derived from a holographic transparent image of an object such as a matt surface. The embossed and metallised sheet material is used for many applications such as decals, greetings cards, advertising cards and product finishes.

However, these patterns have a diffractive (reflective) efficiency which is relatively low, and the width of the band of diffracted colour is quite small. So the image appears dull, and the spectral colours can only be seen within a limited angle of view.

The invention aims to provide decorative patterns on a surface improved in both these respects. It also provides a method and apparatus for the purpose of producing the patterns.

The invention provides a material having a surface which bears a light diffracting pattern in the form of a series of well defined parallel grooves and ridges, wherein the transverse cross-section of the surface has a non-cyclical sequence of peaks and troughs. The surface is preferably reflective.

Such a pattern is much more reflectively efficient so that the colours of the refracted spectrum are brighter, but also the angle of view within which the colours can be seen is much wider and consequently the angular position of the decorative surface relative to the source of illumination is less critical.

In order to produce the pattern as defined above, holographic techniques are not required, only those relating basically to the generation of a diffraction grating. Accordingly the invention proposes a method of generating a light diffracting pattern on a surface, or an embossing master for forming such a surface, which includes the steps of illuminating a photosensitive surface with two coherent monochromatic beams of light, one being a reference beam, the second being at an angle thereto and being split into a bundle of divergent beams all of which illuminate the same area of the surface as the reference beam, and developing and fixing the sensitive layer. The method causes multiple overlapping interference grating patterns to be produced by interference of the reference beam with each of the beams in the bundle. This provides a grating with well defined grating lines but a cross-section which is irregular and non-repetitive. Because the grating lines are sharp this provides an efficient diffractin of the incident light, while the irregular disposition of the surfaces of the troughs and ridges provide an improved angular spread.

Finally, the invention provides apparatus for use in the method which employs a lens system which divides the second beam into the bundle of convergent beams.

In order that the invention shall be clearly understood, an exemplary embodiment of the invention will now be described with reference to the accompanying drawings, in which.

Figure 1:
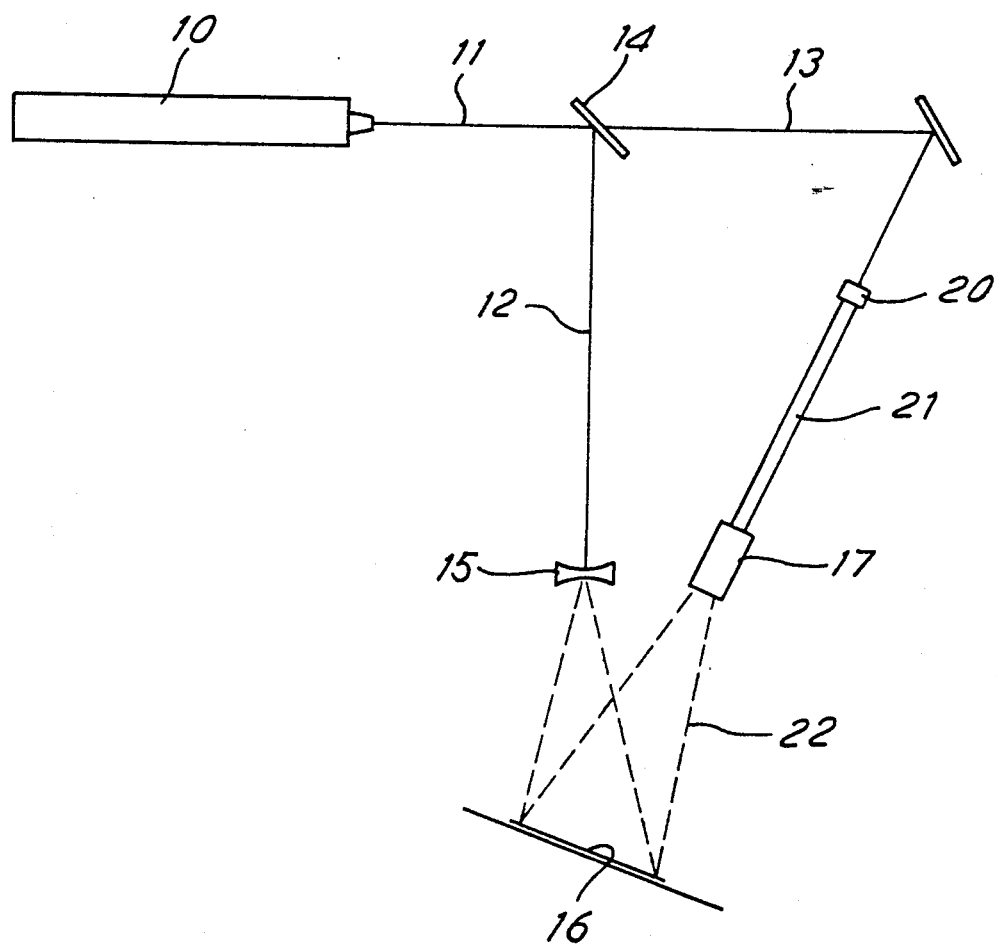
FIG. 1 shows schematically in plan view an optical system for carrying out the method of the invention.

Referring first to FIG. 1, a laser light source 10 produces a beam 11 of coherent monochromatic light which is divided into a reference beam 12 and a second beam 13 by a partially silvered mirror 14. The beam 12 is spread by a lens 15 so as to illuminate evenly the surface of a photo-resist, photo-sensitive plate 16. The second beam 13 is spread vertically and passed through an optical gate 20 to form a narrow vertical beam 21. This in turn passes through an optical device 17 described later which has the effect of dividing the beam 21 into a large number of small divergent beams 22 which each fall uniformly on the same plate 16. Since the beam 12 and the beams 22 fall on the plate 16 at an angle to each other, the conditions exist for the formation of interference.

Moreover, the beams 22 still retain wave fronts with spatial coherence (unlike the system for production of a holographic image) so that the basic interference pattern produced is that of a straight line diffraction grating. But because there is a multiplicity of beams 22, the fringe intensity across the plate 16 does not vary sinusoidally as for a pure grating.

As is conventional, the plate 16 accepts an image of the pattern by exposure which can be developed to produce an etched relief pattern in the emulsion surface. The plate can thereafter be used as an embossing master in a further process to emboss the identical pattern on a highly reflective plastics sheet usable for various decorative purposes. In fact, as is also conventional, the whole of plate 16 is not uniformly exposed. Rather, its area is split into sets of smaller individual areas, each set being defined by a mask placed in contact with the surface of the plate 16. An exposure is made with each mask, and for each exposure the angle of incidence of the beams 22 is slightly different by an amount of about 2°. This gives each area or set of areas defined by one mask a grating pattern with a different frequency, which therefore eventually reflects a different coloured light from any one given angle.

Figure 2:
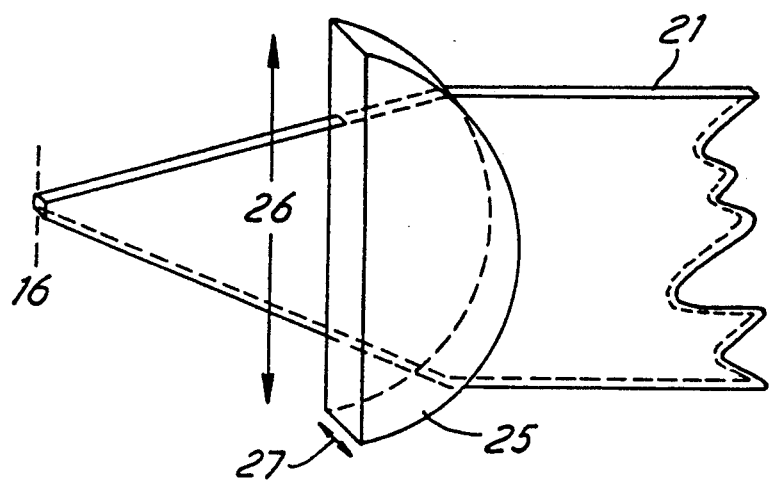
FIG. 2 shows a perspective view of a lens forming part of the optical system.
Figure 3:
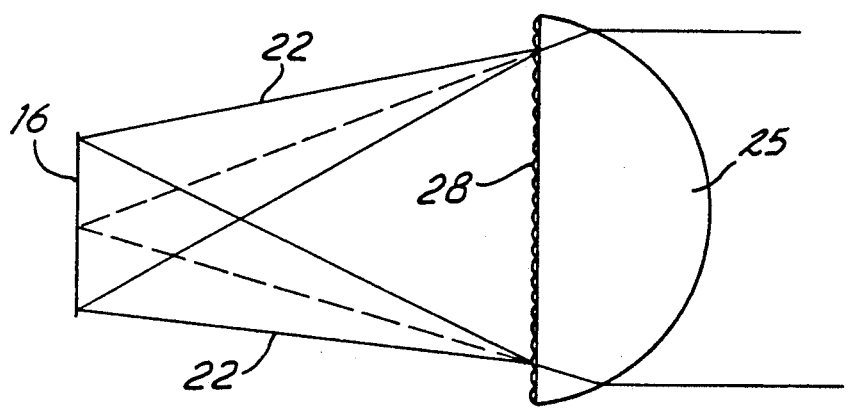
FIG. 3 shows a side elevation of the FIG. 2 lens as modified for the invention.
Figure 4:
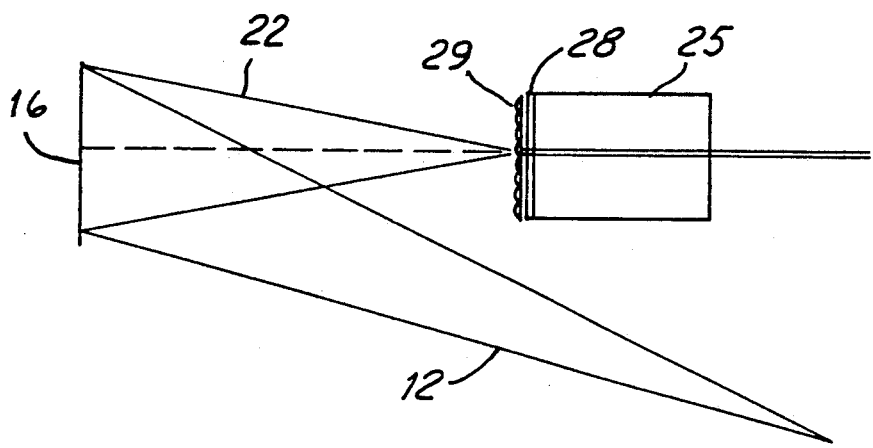
FIG. 4 shows the lens further modified, from above.

The optical device 17 is shown in FIGS. 2 to 4. The device has three basic elements: a plano-cylindrical lens 25 and two sets 28 and 29 of lenses on the elongate plane surface of lens 25. Lens 25 has a height 26 and a width 27 matched to the narrow vertical beam 21 (in practice, about 30 cms high and ½ cm wide of the lens is used). This on its own would focus the beam 21 onto the surface of plate 16.

Lens set 28 consists of a large number e.g. 1000 of divergent cylindrical lenses, which are cylindrical in cross section and which cause the beams to diverge, which divide the height 26 so as to form a corresponding number of divergent individual beams 22 which again fill the full height of the plate 16. However, these beams would still be as narrow as the beam 21. Lens set 29 therefore consists of a much smaller number e.g. 20 of divergent cylindrical lenses which spread each of the beams 22 to fill the width of the plate 16, as seen in plan view in FIG. 4. In theory, only a single lens might be used instead of lens set 29.

Figure 6A:
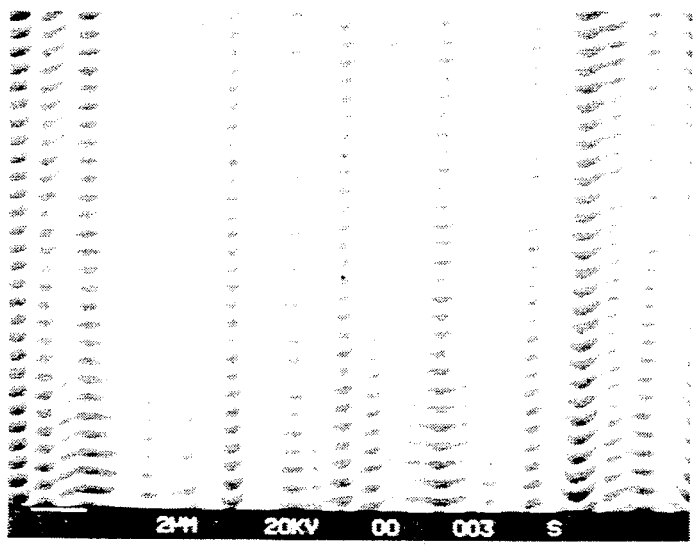
FIGS. 6a and 6b show scans of a reflective surface according to the invention.

The electron microscope scan in FIG. 6 shows the relief pattern produced on the plate 16 by the method described. Image 6a is to a greater magnification and shows clearly the sharply defined nature of the pattern of vertical parallel grooves and ridges which covers the whole area, and the non-repetitive and irregular but nevertheless geometrically-shaped form of the horizontal cross-section. The cross-section is characterised by a series of lines, curves and relatively sharp changes of direction. Image 6b to a smaller magnification illustrates that the variation in the longitudinal relief (evident from changes in intensity of the lines along their length) is very slight and has a frequency which is orders of magnitude smaller.

Figure 5:
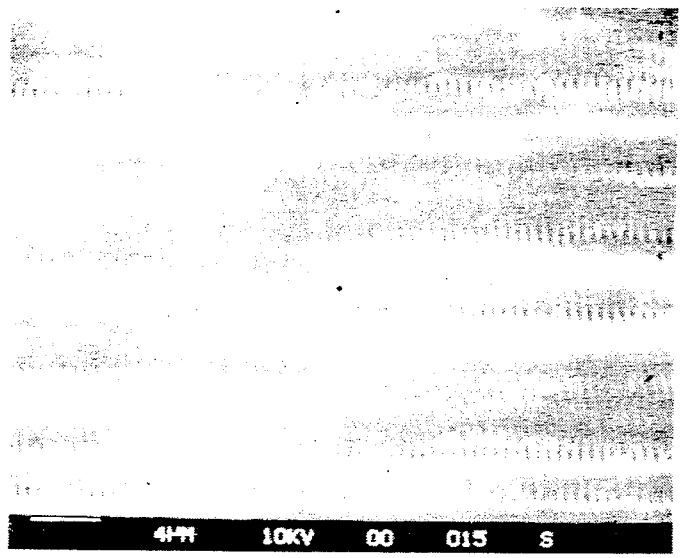
FIG. 5 shows an electron microscope scan of a reflective surface as produced by known methods.
Figure 6B:
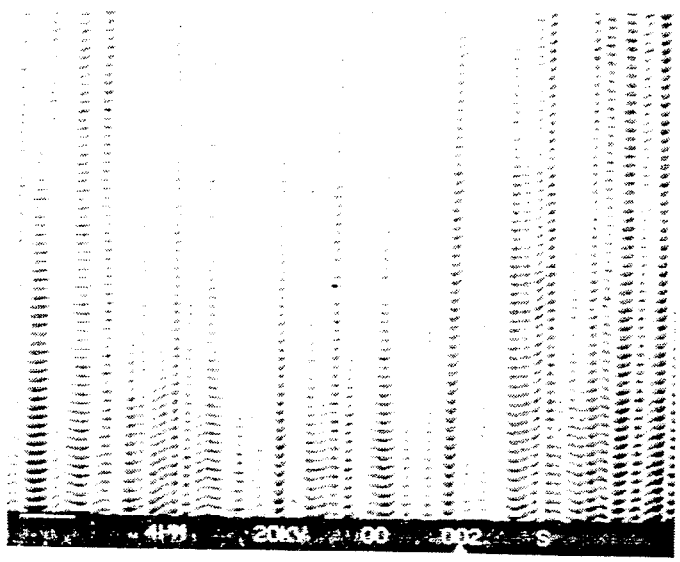

FIG. 6b can be compared with the pattern shown in FIG. 5 which is produced by the interference of one coherent beam and a second beam which carries a holographic image. FIGS. 5 and 6b are to the same magnification. It can be seen that the vertical lines are there but relatively ill-defined, and that they have a cross-section which is a series of curves more akin to a somewhat disturbed sine wave. In the vertical direction there is a relatively more frequent alteration in the relief, and there are areas which appear to carry very little relief pattern at all. By contrast, diffraction grating produced for scientific purposes would show a pattern of identical sharply defined vertical parallel lines with a cross-section like regular a sine wave.

The relief pattern according to the invention is much improved in decorative effect. Held under a light source with the lines extending side-to-side, and tilted about a horizontal axis so as to vary the angle of incidence, the colours produced vary according to the angle and are much brighter than has been achievable in the past. Swivelled about a vertical axis, the colour is unchanged and is clearly visible over an angle which is much greater than has been the case with known surfaces using either a diffraction grating or a pattern incorporating a holographic image.

I claim:

1. A method of generating a surface with a light diffracting pattern by a method including the following steps:

generating two coherent monochromatic beams of light, comprising a reference beam and a second beam which consists of a bundle of divergent sub-beams;

illuminating a photosensitive surface with both the reference beam and the second beam at an angle to each other; and developing and fixing the photosensitive surface;

wherein the second beam is itself generated by passing a single light beam through a mask to form a narrow strip of light, then passing that light through a narrow D-shaped plano-cylindrical lens which tends to focus the strip onto the sensitive surface as a narrow line transverse to the strip of light, and finally passing the narrow strip of light through a plurality of first small plano-cylindrical lenses extending transverse to the strip of light, each such lens serving to divide the light into the plurality of individual sub-beams in the bundle.

2. A method as claimed in claim 1, wherein each individual beam is spread laterally of the strip of light by passing it through one or more further small plano-cylindrical lenses which extend transverse to said first plano-cylindrical lenses which extend transverse to said first plano-cylindrical lenses.

3. A method as claimed in claim 1, wherein the photosensitive surface is selectively masked during a plurality of operations of the illumination step.

4. A material having a surface carrying a light diffracting pattern and produced by the method or claim 1 or claim 2.

5. Apparatus for producing a light diffracting pattern on a surface comprising a source of coherent monochromatic light, a beam splitter producing first and second coherent light beams, means for projecting the first coherent beam onto a photo-sensitive surface, as a reference beam, and means for generating a bundle of divergent sub-beams from the second coherent beam and for projecting said bundle onto said surface at an angle to the reference beam, wherein said means for generating the second beam and projecting it onto said surface comprises a narrow D-shaped plano-cylindrical lens which tends to focus a narrow beam of light reaching its convex side into a narrow line across the beam at said surface, and a plurality of first small plano-cylindrical lenses extending across the beam and positioned closely adjacent the plane side of the lens.

6. Apparatus as claimed in claim 5, wherein a further at least one small plano-cylindrical lens extends transverse to said first plano-cylindrical lenses and adjacent to them.

* * * * *